US009329809B2

(12) United States Patent
Ueno

(10) Patent No.: US 9,329,809 B2
(45) Date of Patent: May 3, 2016

(54) SYSTEMS AND METHODS FOR HIERARCHICAL SOURCE FILE CONVERSION AND OUTPUT USING A BASE FILE COMPRISING DISPLAY INFORMATION, LIBRARY FUNCTION, DISPLAY MESSAGE, AND TAG DEFINING INFORMATION NECESSITY

(75) Inventor: Toshiaki Ueno, Osaka (JP)

(73) Assignee: KYOCERA Document Solutions Inc. (JP)

( * ) Notice: Subject to any disclaimer, the term of this patent is extended or adjusted under 35 U.S.C. 154(b) by 1015 days.

(21) Appl. No.: 13/193,795

(22) Filed: Jul. 29, 2011

(65) Prior Publication Data
US 2012/0030561 A1 Feb. 2, 2012

(30) Foreign Application Priority Data

Jul. 30, 2010 (JP) ................. 2010-172896

(51) Int. Cl.
G06F 3/12 (2006.01)
G06F 17/22 (2006.01)
(52) U.S. Cl.
CPC ............ *G06F 3/1204* (2013.01); *G06F 3/1208* (2013.01); *G06F 3/1243* (2013.01); *G06F 3/1244* (2013.01); *G06F 3/1282* (2013.01); *G06F 3/1285* (2013.01); *G06F 17/2247* (2013.01); *G06F 3/1256* (2013.01)
(58) Field of Classification Search
CPC . G06F 17/2705; G06F 8/4435; G06F 3/1204; G06F 3/1208; G06F 3/1243; G06F 3/1244; G06F 3/1256; G06F 3/1282; G06F 3/1285; G06F 17/2247
USPC ......................................... 715/234
See application file for complete search history.

(56) References Cited

U.S. PATENT DOCUMENTS

| 4,860,203 A * | 8/1989 | Corrigan et al. ............... 717/123 |
| 2004/0194072 A1* | 9/2004 | Venter ............................ 717/140 |
| 2006/0085109 A1* | 4/2006 | Freund ................ G06F 11/3672 701/31.4 |
| 2006/0248540 A1* | 11/2006 | Stemer et al. .................. 719/321 |
| 2007/0044066 A1* | 2/2007 | Meijer et al. ................... 717/100 |

FOREIGN PATENT DOCUMENTS

JP 2007-087127 4/2007

OTHER PUBLICATIONS

Prinz, Peter et al. "C in a Nutshell", Dec. 16, 2005, O'Reilly.*
Balena, Francesco et al. "22.6 Jagged Arrays" from Practical Guidelines and Best Practices for Microsoft Visual Basic and Visual C# Developers. Feb. 23, 2005, Microsoft Press.*

* cited by examiner

Primary Examiner — Cesar Paula
Assistant Examiner — Tyler J Schallhorn
(74) Attorney, Agent, or Firm — McDonnell Boehnen Hulbert & Berghoff LLP

(57) ABSTRACT

A non-transitory recording medium stores a program including program codes for causing a computer (a) to read information necessary for a display from a base file, (b) to display information according to base file contents, (c) to read machine type dependent information that (i) is necessary for the display on an output apparatus, (ii) depends on an output apparatus machine type, and (iii) cannot be commonly used in multiple machine types, (d) to create a transaction file composed of function information and an argument necessary for the function without including a control code based on the machine type dependent information, and (e) to instruct the output apparatus to output the information according to the base file contents by using the transaction file and a fixed file that (i) does not depend on the machine type, (ii) can be commonly used in multiple machine types, and (iii) is composed of machine type independent information including the control code.

25 Claims, 11 Drawing Sheets

A {
    <Function>rpg_printf</Function>                      LIBRARY FUNCTION NAME
    <Message>Job Rrror Report</Message>           MESSAGE
    <Position>0,0</Position>                        MESSAGE OUTPUT (X, Y)
    <Variable></Variable>                        VARIABLE TO WHICH FUNCTION REFERS (UNUSED)
    <Font>MS PGothic</Font>                    FONT
    <FontSize>16</FontSize>                       FONT SIZE
    <FontColor>Blue</FontColor>                FONT COLOR(BLUE)
    <ExtFunction></ExtFunction>               EXTERNAL FUNCTION NAME (UNUSED)
}

B {
    <Function>rpg_printf</Function>
    <Message>Phenomenon:</Message>
    <Position>0,10</Position>
    <Variable></Variable>
    <Font>MS PGothic</Font>
    <FontSize>11</FontSize>
    <FontColor>Black</FontColor>
    <ExtFunction></ExtFunction>
}

C {
    <Function>rpg_printf</Function>
    <Message>Only one copy was printed with respect to a print request of multiple copies.</Message>
    <Position>15,10</Position>
    <Variable></Variable>
    <Font>MS PGothic</Font>
    <FontSize>11</FontSize>
    <FontColor>Black</FontColor>
    <ExtFunction></ExtFunction>
}

D {
    <Function>rpg_printf</Function>
    <Message>Reason:</Message>
    <Position>0,12</Position>
    <Variable></Variable>
    <Font>MS PGothic</Font>
    <FontSize>11</FontSize>
    <FontColor>Black</FontColor>
    <ExtFunction></ExtFunction>
}

FIG. 3

E {
<Function>rpg_printf</Function>　　　　　　　　　　LIBRARY FUNCTION NAME
<Message>Memory overflow occurred.</Message>　　MESSAGE
<Position>15,12</Position>　　　　　　　　　　　　MESSAGE OUTPUT (X, Y)
<Variable></Variable>　　　　　　　　　　　　　　VARIABLE TO WHICH FUNCTION REFERS (UNUSED)
<Font>MS PGothic</Font>　　　　　　　　　　　　　FONT
<FontSize>11</FontSize>　　　　　　　　　　　　　FONT SIZE
<FontColor>Black</FontColor>　　　　　　　　　　　FONT COLOR (BLUE)
<ExtFunction></ExtFunction>　　　　　　　　　　　EXTERNAL FUNCTION NAME (UNUSED)

F {
<Function>rpg_printf</Function>
<Message>Solving Method:</Message>
<Position>0,14</Position>
<Variable></Variable>
<Font>MS PGothic</Font>
<FontSize>11</FontSize>
<FontColor>Black</FontColor>
<ExtFunction></ExtFunction>

G {
<Function>rpg_printf</Function>
<Message>Please mount an extended memory (RAM).</Message>
<Position>15,14</Position>
<Variable></Variable>
<Font>MS PGothic</Font>
<FontSize>11</FontSize>
<FontColor>Black</FontColor>
<ExtFunction></ExtFunction>

FIG. 4

```
rpg_printf( "Phenomenon:",          0, 10,    Dummy,   "MS PGothic",     11,   "Black",  Dummy )
{
    // The program can be described here in a manner character strings specified by arguments are printed.
}
```

FIG. 7

| STRUCTURE A = | 1st | 2nd | 3rd | 4th | 5th | 6th | 7th | 8th | 9th | 10th | NUMBER OF UNUSED ARGUMENTS |
|---|---|---|---|---|---|---|---|---|---|---|---|
| FUNCTION POINTER 1 | 1st ARGUMENT | 2nd ARGUMENT | 3rd ARGUMENT | 4th ARGUMENT | 5th ARGUMENT | UNUSED | UNUSED | UNUSED | UNUSED | UNUSED | 5 |
| FUNCTION POINTER 2 | 1st ARGUMENT | 2nd ARGUMENT | UNUSED | UNUSED | UNUSED | UNUSED | UNUSED | UNUSED | UNUSED | UNUSED | 8 |
| FUNCTION POINTER 3 | UNUSED | UNUSED | UNUSED | UNUSED | UNUSED | UNUSED | UNUSED | UNUSED | UNUSED | UNUSED | 10 |
| FUNCTION POINTER 4 | 1st ARGUMENT | 2nd ARGUMENT | UNUSED | UNUSED | UNUSED | UNUSED | UNUSED | UNUSED | UNUSED | UNUSED | 8 |
| FUNCTION POINTER 5 | 1st ARGUMENT | 2nd ARGUMENT | 3rd ARGUMENT | 4th ARGUMENT | 5th ARGUMENT | 6th ARGUMENT | 7th ARGUMENT | 8th ARGUMENT | 9th ARGUMENT | 10th ARGUMENT | 0 |
| FUNCTION POINTER 6 | 1st ARGUMENT | 2nd ARGUMENT | UNUSED | UNUSED | UNUSED | UNUSED | UNUSED | UNUSED | UNUSED | UNUSED | 8 |
| FUNCTION POINTER 7 | 1st ARGUMENT | UNUSED | UNUSED | UNUSED | UNUSED | UNUSED | UNUSED | UNUSED | UNUSED | UNUSED | 9 |
| FUNCTION POINTER 8 | 1st ARGUMENT | 2nd ARGUMENT | 3rd ARGUMENT | UNUSED | UNUSED | UNUSED | UNUSED | UNUSED | UNUSED | UNUSED | 7 |
| FUNCTION POINTER 9 | 1st ARGUMENT | 2nd ARGUMENT | 3rd ARGUMENT | 4th ARGUMENT | UNUSED | UNUSED | UNUSED | UNUSED | UNUSED | UNUSED | 6 |
| FUNCTION POINTER 10 | UNUSED | UNUSED | UNUSED | UNUSED | UNUSED | UNUSED | UNUSED | UNUSED | UNUSED | UNUSED | 10 |
| FUNCTION POINTER 11 | 1st ARGUMENT | 2nd ARGUMENT | 3rd ARGUMENT | 4th ARGUMENT | 5th ARGUMENT | 6th ARGUMENT | 7th ARGUMENT | 8th ARGUMENT | UNUSED | UNUSED | 2 |
| FUNCTION POINTER 12 | 1st ARGUMENT | 2nd ARGUMENT | UNUSED | UNUSED | UNUSED | UNUSED | UNUSED | UNUSED | UNUSED | UNUSED | 8 |
| FUNCTION POINTER 13 | 1st ARGUMENT | 2nd ARGUMENT | 3rd ARGUMENT | 4th ARGUMENT | 5th ARGUMENT | UNUSED | UNUSED | UNUSED | UNUSED | UNUSED | 5 |
| FUNCTION POINTER 14 | 1st ARGUMENT | UNUSED | UNUSED | UNUSED | UNUSED | UNUSED | UNUSED | UNUSED | UNUSED | UNUSED | 9 |
| FUNCTION POINTER 15 | 1st ARGUMENT | 2nd ARGUMENT | UNUSED | UNUSED | UNUSED | UNUSED | UNUSED | UNUSED | UNUSED | UNUSED | 8 |
| FUNCTION POINTER 16 | 1st ARGUMENT | UNUSED | UNUSED | UNUSED | UNUSED | UNUSED | UNUSED | UNUSED | UNUSED | UNUSED | 9 |
| FUNCTION POINTER 17 | 1st ARGUMENT | 2nd ARGUMENT | 3rd ARGUMENT | 4th ARGUMENT | 5th ARGUMENT | 6th ARGUMENT | UNUSED | UNUSED | UNUSED | UNUSED | 4 |
| FUNCTION POINTER 18 | 1st ARGUMENT | 2nd ARGUMENT | 3rd ARGUMENT | UNUSED | UNUSED | UNUSED | UNUSED | UNUSED | UNUSED | UNUSED | 7 |
| FUNCTION POINTER 19 | UNUSED | UNUSED | UNUSED | UNUSED | UNUSED | UNUSED | UNUSED | UNUSED | UNUSED | UNUSED | 10 |
| FUNCTION POINTER 20 | 1st ARGUMENT | 2nd ARGUMENT | 3rd ARGUMENT | 4th ARGUMENT | 5th ARGUMENT | 6th ARGUMENT | 7th ARGUMENT | UNUSED | UNUSED | UNUSED | 3 |

TOTAL NUMBER OF UNUSED ARGUMENT = 136

FIG. 9

SYSTEMS AND METHODS FOR HIERARCHICAL SOURCE FILE CONVERSION AND OUTPUT USING A BASE FILE COMPRISING DISPLAY INFORMATION, LIBRARY FUNCTION, DISPLAY MESSAGE, AND TAG DEFINING INFORMATION NECESSITY

REFERENCE TO RELATED APPLICATIONS

This application is based upon and claims the benefit of priority from the corresponding Japanese Patent Application No. 2010-172896, filed in the Japan Patent Office on Jul. 30, 2010, the entire contents of which are incorporated herein by reference.

BACKGROUND

1. Technical Field

The present disclosure relates to a process of displaying information according to contents of a base file in an electronic device system provided with a display apparatus, an output apparatus, and an electronic device, and creating an output file based on the base file.

2. Description of the Related Art

As part of system development for a print design, a specification document for output data is initially created, and a source file for printing is created based on the specification document in some cases. This specification document is used for clarifying an output image printed on a printing sheet and is also utilized as an evaluation specification document when the printed sheet is to be evaluated.

According to the above-mentioned method, it is necessary to create both the specification document and the source file. Also, the specification document needs to be created initially, and the source file needs to be created thereafter.

Furthermore, as it is necessary to separately create the specification document and the source file, the created source file may not coincide with the base specification document in some cases. To elaborate, though the source file is required to truly reproduce the specification based on the specification document, the source file is created by a person, and some bugs, coding errors, and the like tend to be inevitably generated.

Therefore, even when the finished source file is actually compiled and a program is operated, printed material may not be generated in conformity to the output data specification document in some cases. In this regard, it often happens that the actually output printed material is visually compared with the specification document to correct the source file.

Additionally, as the case stands, although it depends on the type of printer or the like, an actual report page or status page may have 40 types of setting items, and detailed sections may not be checked throughout by any means.

Furthermore, both the specification document and the source file need to be corrected each time there is a change to the specification of an image forming apparatus. For this reason, the specification document is corrected first, and then the source file also needs to be corrected on the basis of the corrected specification document.

SUMMARY

A non-transitory computer-readable recording medium according to the present disclosure stores a program for an electronic device that is executed by a computer of the electronic device connected to a display apparatus and an output apparatus. The program for the electronic device includes a first through fifth program code. The first program code causes the computer to read information necessary for a display on the display apparatus from a base file described in a specific descriptive language. The second program code causes the computer to display information according to contents of the base file on the display apparatus based on the information necessary for the display. The third program code causes the computer to read, from the base file, machine type dependent information that (i) is information necessary for the display on the output apparatus, (ii) depends on a machine type of the output apparatus, and (iii) cannot be commonly used in a plurality of machine types. The fourth program code causes the computer to create a transaction file composed of function information and an argument necessary for the function, without including a control code based on the machine type dependent information. The fifth program code causes the computer to instruct the output apparatus to output the information according to the contents of the base file by using the transaction file and a fixed file composed of machine type independent information that (i) includes the control code, (ii) does not depend on the machine type of the output apparatus, and (iii) can be commonly used in the plurality of machine types.

An electronic device system according to the present disclosure includes a display apparatus, an output apparatus, and a transaction file creation unit. The display apparatus is configured to read information necessary for a display from a base file described in a specific descriptive language and display information according to contents of the base file based on the information necessary for the display. The output apparatus is configured to output the information according to the contents of the base file by using a transaction file and a fixed file composed of machine type independent information that (i) includes a control code, (ii) does not depend on a machine type of the output apparatus and (iii) can be commonly used in a plurality of machine types. The transaction file creation unit is configured to read, from the base file, machine type dependent information that (i) is information necessary for the output, (ii) depends on the machine type of the output apparatus, and (iii) cannot be commonly used in the plurality of machine types, and create the transaction file composed of the function information and an argument necessary for the function without including the control code based on the machine type dependent information.

A control method for the electronic device system according to the present disclosure includes (a) a display apparatus reading information necessary for a display from a base file described in a specific descriptive language and displaying information according to a contents of the base file based on the information necessary for the display, (b) a transaction file creation unit reading, from the base file, machine type dependent information that (i) is information necessary for the output, (ii) depends on a machine type of an output apparatus, and (iii) cannot be commonly used in a plurality of machine types, and creating a transaction file composed of function information and an argument necessary for the function without including a control code based on the machine type dependent information, and (c) the output apparatus outputting information according to the contents of the base file by using the transaction file and a fixed file composed of machine type independent information that (i) includes the control code, (ii) does not depend on the machine type of the output apparatus and (iii) can be commonly used in the plurality of machine types.

Additional features and advantages are described herein, and will be apparent from the following Detailed Description and the figures.

BRIEF DESCRIPTION OF THE DRAWINGS

In the accompanying drawings:

FIG. 3 illustrates contents of a former stage of an XML file;

FIG. 4 illustrates contents of a latter stage of the XML file;

FIG. 7 illustrates an example of a fixed part;

FIG. 9 illustrates a configuration example of a structure in related art;

DETAILED DESCRIPTION

Hereinafter, an embodiment of the present disclosure will be described with reference to the drawings.

Figure 1:
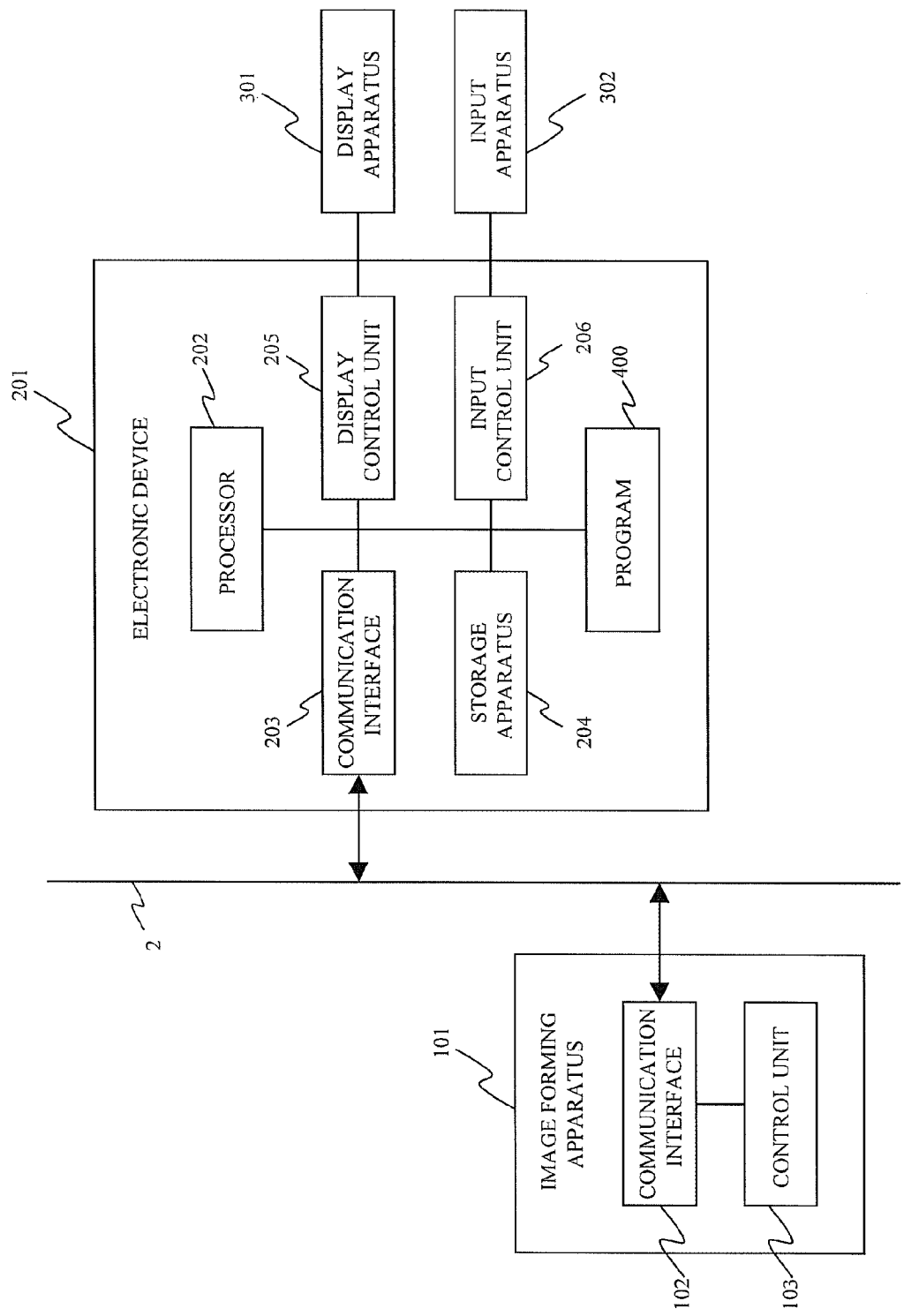
FIG. 1 illustrates a configuration example of an electronic device system according to an embodiment of the present disclosure.

FIG. 1 illustrates a configuration example of an electronic device system according to the embodiment. The electronic device system is provided with image forming apparatus 101 (output apparatus) and electronic device 201. One electronic device system is constituted in a state in which image forming apparatus 101 and electronic device 201 are connected to network 2.

First, the configuration of image forming apparatus 101 will be described.

Image forming apparatus 101 is, for example, a network device such as a network printer. To function as a printer, image forming apparatus 101 has a built-in print engine that is not illustrated in the drawing. The print engine includes a photosensitive member drum, a charger, an exposure unit, a toner development unit (an intermediate transfer belt in the case of a color printer), and the like, which are not illustrated in the drawing. Furthermore, a sheet feeder that is not illustrated in the drawing is attached to image forming apparatus 101.

It should be noted that image forming apparatus 101 may also be a network-connected digital multifunctional machine instead of the network printer. In this case, image forming apparatus 101 is further provided with an image reading unit. In the image reading unit, for example, in addition to a scanning optical system to which a scanner lamp and a mirror are mounted, a converging lens and an optical element such as a CCD are built in. Also, a mode may be adopted in which an automatic document feeder (ADF) is equipped while being attached to the image reading unit.

Also, image forming apparatus 101 is further provided with communication interface 102 and a control unit 103.

Communication interface 102 is a communication adapter for establishing a connection to network 2. Control unit 103 is a component functioning as a computer. Control unit 103 is built in image forming apparatus 101 in a mode of an electronic circuit board in which, for example, a processor such as a CPU (Central Processing Unit) and memories such as a ROM (Read Only Memory) and a RAM (Random Access Memory) are implemented. By executing a program, control unit 103 has a function of not only controlling the communication by communication interface 102 but also controlling various processes and operations performed by image forming apparatus 101.

Next, a configuration of electronic device 201 will be described.

For electronic device 201, a generally spread desktop-type PC or a notebook-type PC can be applied. Electronic device 201 is provided with processor (e.g., CPU) 202 as a transaction file creation unit, communication interface 203, storage apparatus 204, display control unit 205, and input control unit 206. Also, electronic device 201 is connected to display apparatus 301 and input apparatus 302.

Communication interface 203 is a communication adapter for establishing a connection to network 2. For storage apparatus 204, a built-in hard disk, a memory, or the like may be applied. Display apparatus 301 is hardware equivalent to a display or a monitor. Display control unit 205 is a display adapter. Also, input apparatus 302 is hardware equivalent to a keyboard, a pointing device, or the like, and the input control unit 206 is an adapter thereof.

The above-mentioned configuration is a basic configuration of the electronic device system. In addition, according to the embodiment, as the computer executes program 400 for the electronic device that is installed into electronic device 201, the computer operates as the electronic device system according to the embodiment. Program 400 may be stored in storage apparatus 204.

Next, a report page automatic generation algorithm in program 400 used in the embodiment will be described.

Figure 2:
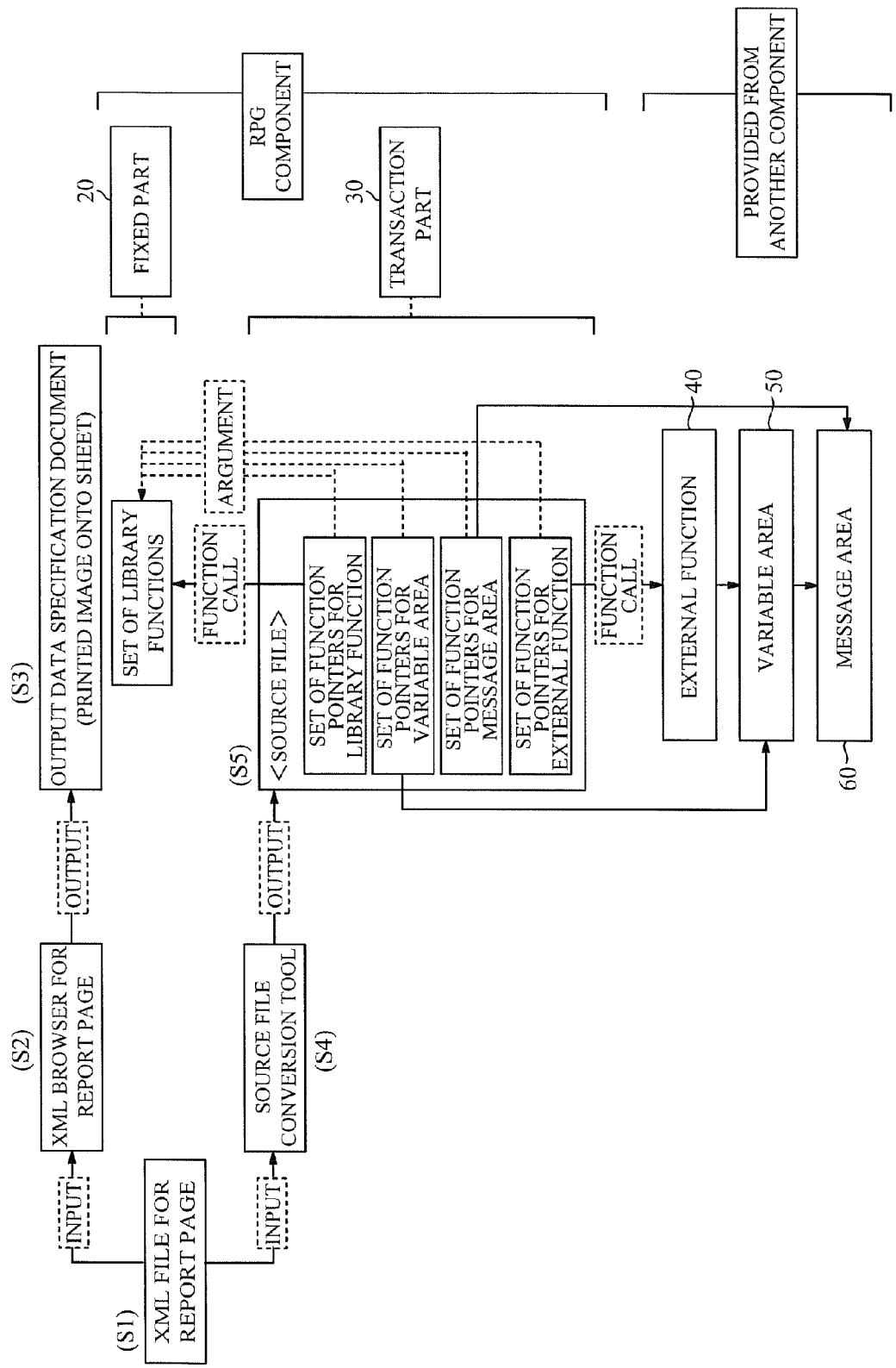
FIG. 2 illustrates a software configuration diagram of a report page automatic generation algorithm.

FIG. 2 illustrates a software configuration diagram of a report page automatic generation algorithm.

First, as illustrated in step S1 in the drawing, an XML (extensible markup language) file is prepared as a base file. This XML file is manually created by a person. Herein, XML is one of descriptive languages for document structures and corresponds to an extended version of HTML (hyper text markup language). XML is adapted by optimizing SGML (standard generalized markup language) to the internet. It is possible for a user to define unique attribution information and logical structures with respect to data in documents with XML.

FIG. 3 and FIG. 4 illustrate contents of the XML file. FIG. 3 illustrates a former stage part of the XML file, and FIG. 4 illustrates a latter stage part of the XML file.

In the examples of FIG. 3 and FIG. 4, seven blocks (A to G) are described.

In the XML file, a tag is newly defined for the report page. In any blocks in the XML file, sequentially from the top, items of a library function name, a message, a message output position (X coordinate, Y coordinate), a variable to which a function refers, a font, a font size, a font color, and an external function name are set (prescribed).

Herein, first block A of FIG. 3 will be described. It should be noted that detailed contents of the blocks from second block B to seventh block G illustrated in FIG. 3 and FIG. 4 are respectively different from that of first block A of FIG. 3, but basic contents such as a manner of defining the tag are similar to that of first block A.

<Function>rpg_printf</Function>

This description represents that the library function name is rpg_printf. This function is used for actually printing contents of the following message by using image forming apparatus 101.

<Message>Job Error Report</Message>

This description represents that characters "Job Error Report" are output as the message. The expression "Job Error Report" is output by the function "rpg_printf".

<Position>0,0</Position>

This description represents that the message is output at a position of (the X coordinate, the Y coordinate)=(0, 0).

<Variable></Variable>

This description represents that no variable exists to which the function refers. It should be noted that if a variable exists to which the function refers, the variable needs to be described.

<Font>MS PGothic</Font>

This description represents that the message is displayed in MS PGothic.

<FontSize>16</FontSize>

This description represents that the message is displayed in a size of 16 points.

<FontColor>Blue</FontColor>

This description represents that the message is displayed in blue.

<ExtFunction></ExtFunction>

This description represents that no external function is used. It should be noted that if an external function to be used exists, the external function needs to be described.

Next, as illustrated in FIG. 2, the prepared XML file is input into an XML browser (step S2). Herein, the XML browser refers to software for displaying the contents described in the XML file on a display apparatus to enable browsing. Once created, the XML browser can be used as a general-purpose tool thereafter. The XML browser reads the XML file and displays the contents of the XML file on the display apparatus as an output data specification document (printed image onto a sheet) (step S3).

Figure 5:
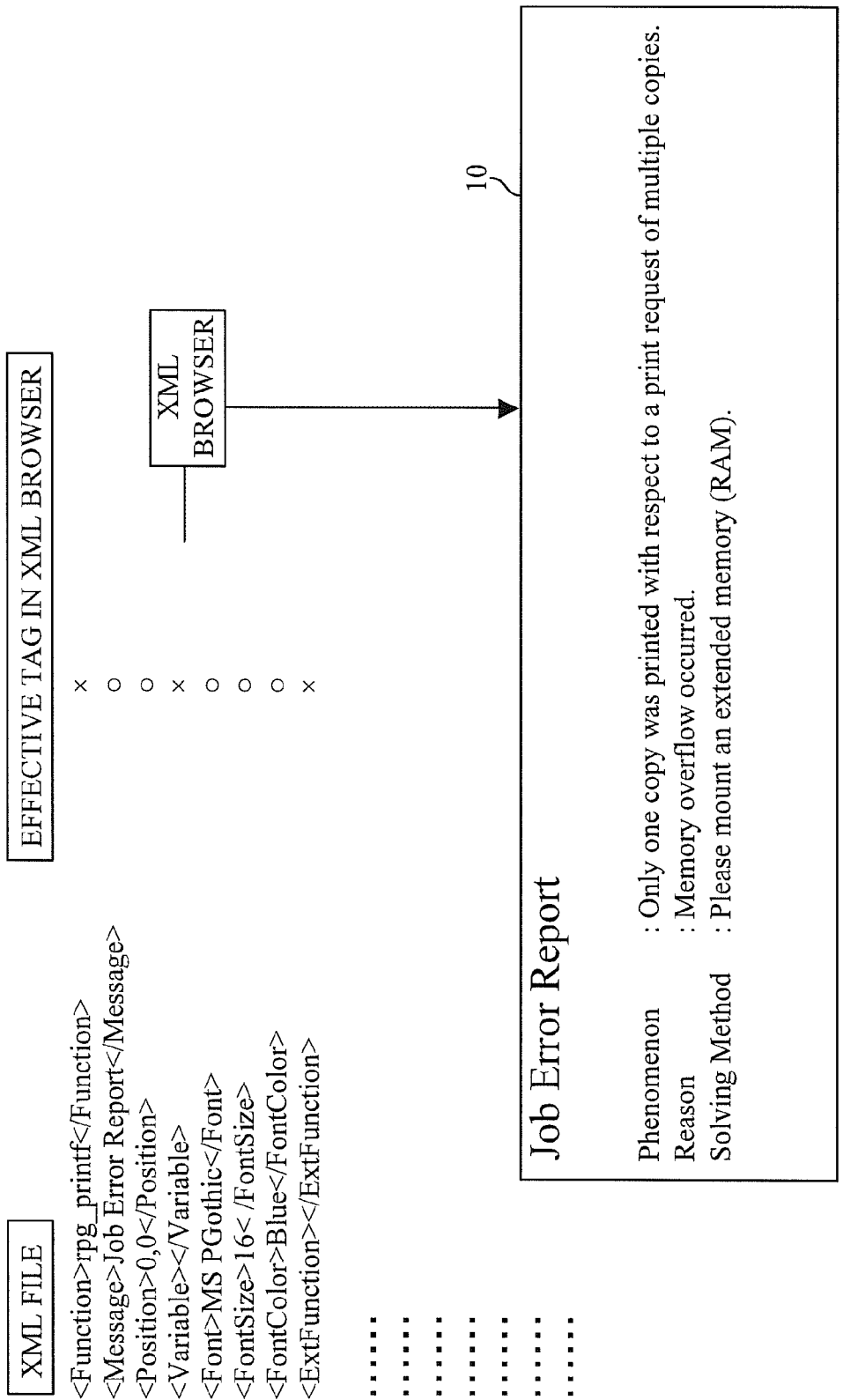
FIG. 5 illustrates a flow of a process in an XML browser.

FIG. 5 illustrates a flow of a process in an XML browser.

The XML browser determines an effective tag in the XML browser among the contents described in the XML file. In FIG. 5, "◯" denotes a necessary item, and "x" denotes an unnecessary item.

For example, with regard to the item <Function>rpg_printf</Function> in the XML file, the determination is "x", that is, it is determined as an unnecessary item. This is because the item <Function> is a necessary function in the image forming apparatus, but the item is not a necessary function in the case of the display by the XML browser.

In contrast to this, with regard to the item <Message>Job Error Report</Message> in the XML file, the determination is "◯", that is, it is determined as a necessary item. This is because the item <Message> is a necessary function in the image forming apparatus and also is a necessary function in the case of the display by the XML browser.

With this configuration, by defining the necessary items in the XML browser, it is possible to extract only the necessary items.

Then, by extracting only the necessary items in the XML browser (the items having "◯" in FIG. 5), output data specification document 10 is displayed on the display apparatus. Contents of output data specification document 10 are the contents obtained by extracting only the necessary items from the XML file. To be more specific, such contents "Job Error Report/Phenomenon: Only one copy was printed with respect to a print request of multiple copies./Reason: Memory overflow occurred./Solving Method: Please mount an extended memory (RAM)." is displayed. These contents are displayed by combining the contents of all the blocks (A to G) in the XML file of FIG. 3 and FIG. 4.

Next, as illustrated in FIG. 2, the created XML file is input into a source file conversion tool (step S4). Herein, the source file conversion tool refers to software for converting the contents described in the XML file into a header file. Once created, the source file conversion tool can thereafter be used as a general-purpose tool. The source file conversion tool reads the XML file and creates a header file of transaction part 30 (step S5).

Figure 6:
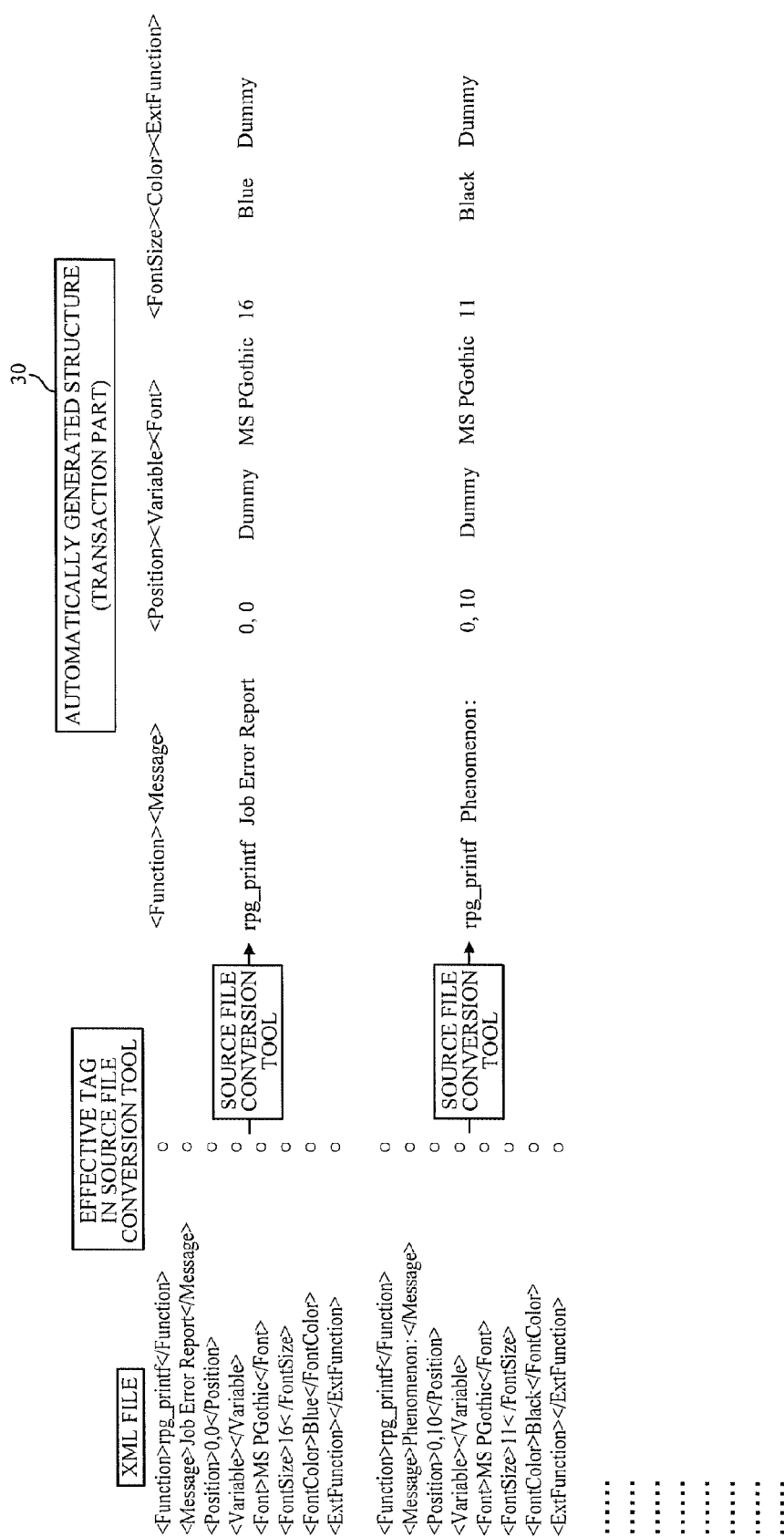
FIG. 6 illustrates a flow of a process in a source file conversion tool.

FIG. 6 illustrates a flow of a process in a source file conversion tool.

The source file conversion tool determines an effective tag in the header file among the contents described in the XML file.

The source file conversion tool determines all the items as effective tags unlike the XML browser. As a result, all the items are determined as "◯", that is, determined as the necessary items. This is because, when the printing is actually carried out, all the contents described in the XML file become the necessary items.

Then, by extracting all the items in the XML file by the source file conversion tool, the header file of transaction part 30 is automatically generated. In the XML file, only the character strings are enumerated, and a control element is not included, so that it is possible to easily extract these character strings to generate the header file. For example, the change can be realized by sequentially reading the XML file from the top and simply extracting the character strings in angle brackets.

Then, as illustrated in FIG. 6, the header file of transaction part 30 is composed of a structure having function information (function pointer) and arguments necessary for the function.

To be more specific, with regard to the first top block, "rpg_printf" as the function information on the leftmost side and "Job Error Report", "0,0", "Dummy", "MS PGothic", "16", "Blue", and "Dummy" as the arguments on a right side thereof are sequentially arranged. With regard to the second block, "rpg_printf" as the function information and "Phenomenon:", "0,10", "Dummy", "MS PGothic", "11", "Black", and "Dummy" as the arguments are sequentially arranged. Herein, "Dummy" represents that no specific argument exists.

A descriptive method for an actual structure varies also depending on a program language. An exemplary description follows:

```
struct function{
    func1, a, b, c;/* function pointer and arguments of func1 */
    func2, d, e, f;/* function pointer and arguments of func2 */
    func3, g, h, i;/* function pointer and arguments of func3 */
};
```

For a file used for actually creating an object file through compiling, as illustrated in FIG. 2, fixed part 20 and transaction part 30 are necessary. Fixed part 20 is composed of a program file (fixed file) such as "file01.c" in the case of C language. Transaction part 30 is composed of a header file (transaction file) such as "header01.h".

According to the embodiment, machine type independent information that can be commonly used in a plurality of machine types without depending on a machine type of the image forming apparatus is described in a program file of fixed part 20. Machine type dependent information that cannot be commonly used in a plurality of machine types that depends on the machine type of the image forming apparatus is described in the header file of transaction part 30.

For example, in a case where a machine type is created first and then another new machine type is created, it is burdensome to correct all the programs. Therefore, in the embodiment, the program part in fixed part 20 is unchanged, and only the program part in transaction part 30 is corrected. With regard to fixed part 20, the same program can be continuously used, as the productivity in the program development is increased and the number of defects is also decreased, the stability as the software can be secured.

Herein, fixed part 20 is a set of library functions. Each of the library functions is input into parts for each function. Each of the library functions can be used without depending on the machine type. The library function is prepared in the first machine type development. In the development for the second and subsequent machine types, for the library function, a part corresponding to an added function is entered in the parts.

Also, fixed part 20 collects the library functions for each function to be put into a single source file for each function. According to this, by excluding a function unnecessary in a certain machine type from link targets at a time when the relevant source file is compiled, it is possible to avoid compiling the unnecessary function. Therefore the size of the eventually generated object file (execution file) can be reduced. For example, library function groups associated with FAX are collected into fax_lib.cpp, and as the FAX function is not necessary in a printer, fax_lib.cpp may be excluded from the link targets at the time of the linking.

Also, the program file of fixed part 20 is composed of a mode by including a control code (for example, a loop process such as for-statements and a branch process such as if-statements). The header file of transaction part 30 is composed of a structure having the function information and an argument necessary for the function without including a control code.

As described above, the header file of transaction part 30 is automatically generated from the XML file, and transaction part 30 is composed of only the header file. As transaction part 30 is composed of only the header file, it is possible to automatically generate the header file from the XML file easily. In the header file of transaction part 30, the function pointer for calling the library function in fixed part 20 and arguments thereof are described. It is possible to deal with the machine type dependent part by changing the function pointer (address at a time when the library function of the fixed part is called) that is described in the header file of transaction part 30.

For example, a main loop of the program file of fixed part 20 is designed so that all the functions are called, and in the header file of transaction part 30, it is possible to comment out (invalidate) the unnecessary functions. For this reason, in a certain machine type, all the functions of func1, func2, func3, and func4 are called, and in another machine type, if func1 and func3 are commented out, limited functions such as func2 and func4 can be called. In this manner, all the functions are prepared in fixed part 20, and in the header file of transaction part 30, the call function is adjusted through the commenting out, so that it is possible to easily select the call function.

FIG. 7 illustrates an example of a fixed part.

With regard to the program file of the fixed part, as the program cannot be automatically generated, it is necessary for a person to prepare the program file of the fixed part through coding by itself at the first stage of the development. To be more specific, the description is made while following the descriptive method of the used program language.

In the example illustrated in the drawing, the following is described.

```
rpg_printf("Phenomenon:", 0,10, Dummy, "MS PGothic", 11,
"Black", Dummy) {
    // The program is described here in a manner character strings
    specified by arguments are printed.
}
```

The arguments to be actually used are described in parenthesis, and the program code is described in brackets so that the character strings specified by the arguments are printed. This functions to that of the second block B of FIG. 3.

Figure 8:
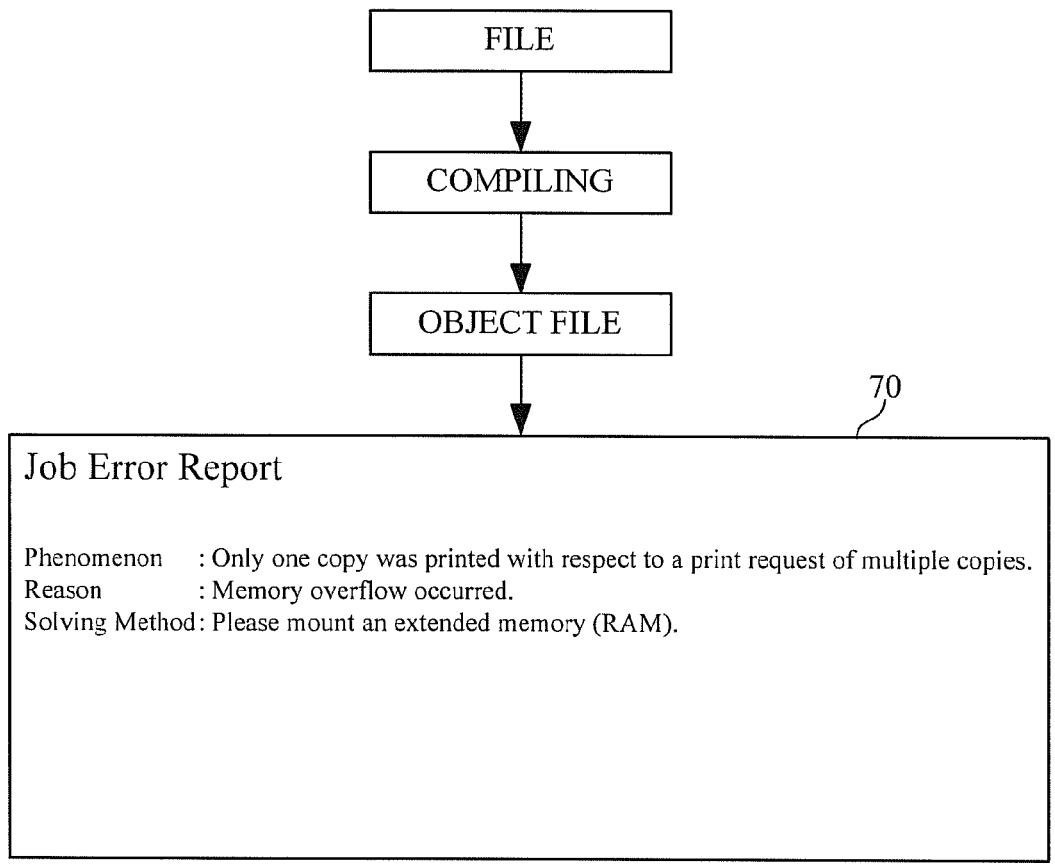
FIG. 8 illustrates a procedure in which a printed product is output.

FIG. 8 illustrates a procedure in which a printed product is output.

The object file is created by compiling the source file (the program file of the fixed part and the header file of the transaction part). And then a printed product (report page, status page) 70 is output from the image forming apparatus 101 by actually executing this object file. Print contents of printed product 70 are similar to that of FIG. 5.

The compiling can be carried out by combining, as illustrated in FIG. 2, not only an RPG (Report Program Generator) component but also external function 40, variable area 50, and message area 60 provided from another component as the occasion demands.

Next, an optimization of the structure will be described.

Figure 10:
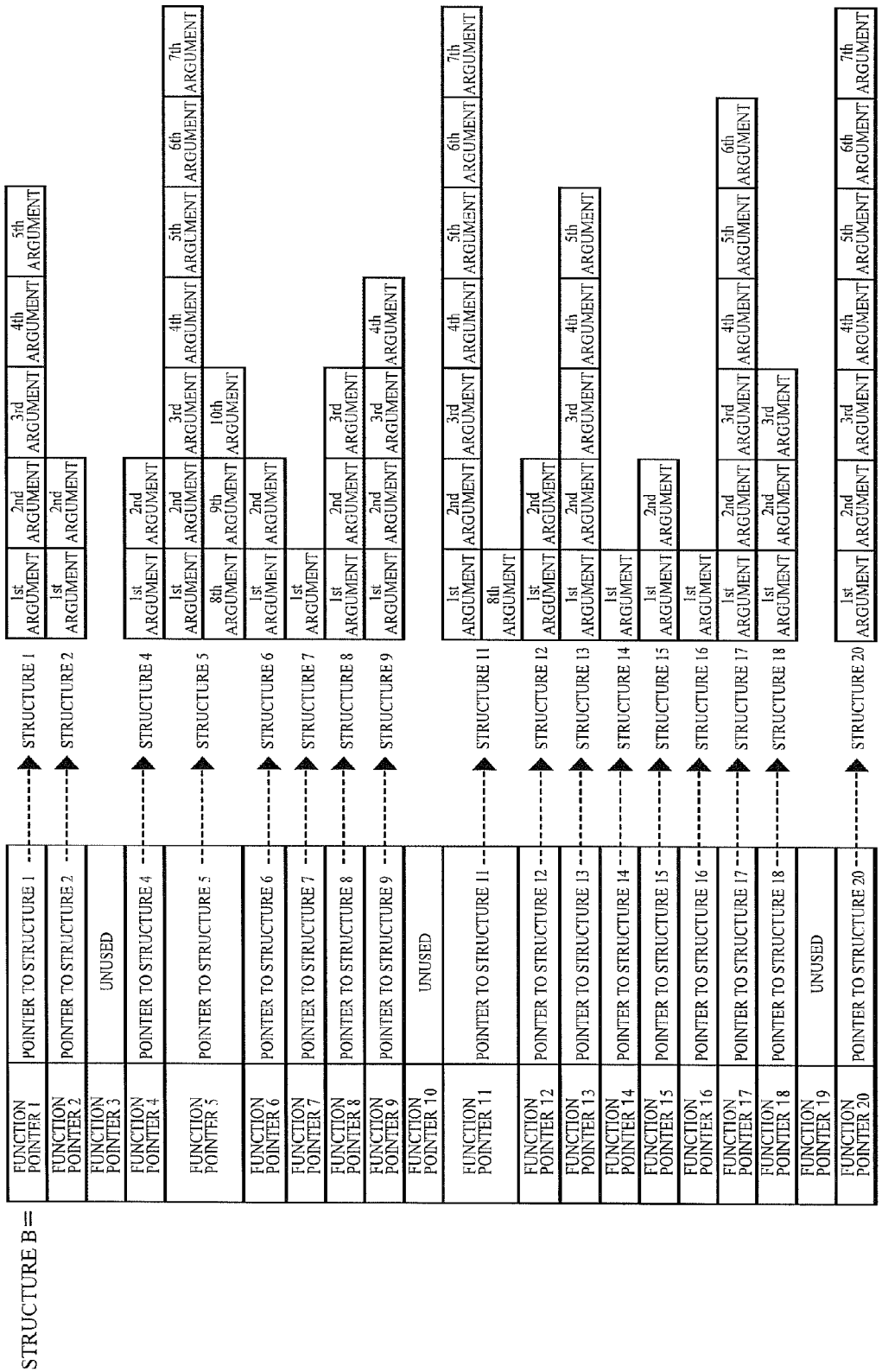
FIG. 10 illustrates a configuration example of a structure of the embodiment.

FIG. 9 illustrates a configuration example of a structure in related art, and FIG. 10 illustrates a configuration example of a structure of the embodiment.

As illustrated in FIG. 9, in the structure in related art, due to a restriction of the program language, the number of arguments that all members have needs to be matched to the member having the largest number of arguments among the members constituting the structure. In the example of FIG. 9, structure A stores the function pointers and the arguments of the functions, but as the number of arguments that function 5 has is ten, the number of arguments that the other functions have is also matched to ten. For this reason, a part described as unused is an unnecessary argument in actuality, but in relation with the definition of the structure, an argument that becomes dummy needs to be set, and the memory area is accordingly wasted. In the example illustrated in the drawing, 136 memory areas are wasted.

In contrast to this, in the structure according to the embodiment, as illustrated in FIG. 10, instead of collecting information on the function pointers and information on the arguments together into a single structure like the structure in related art, the information on the function pointers and the information on the arguments are arranged into two separate types of structures. To be more specific, the function pointers are arranged in structure B (parent structure), and the arguments are arranged in structures 1 to 20 (child structures). Also, in the structure B, other reference destination addresses of structures 1 to 20 (pointers to the respective structures) are arranged.

In this manner, instead of arranging the arguments of the respective functions in the structure B, by arranging the arguments in the respectively independent separate structures 1 to 20, it is possible to delete the unnecessary arguments. In the example of FIG. 10, the number of structures themselves is increased as compared with the example of FIG. 9, but all the parts for allocating the areas that are unused in FIG. 9 can be deleted, and it is possible to delete the wasted memory areas that are not actually used. According to this, it is possible to reduce the object size after the header file (structure) is compiled.

Next, a flow of a control of an electronic device system according to the embodiment will be described.

Figure 11:
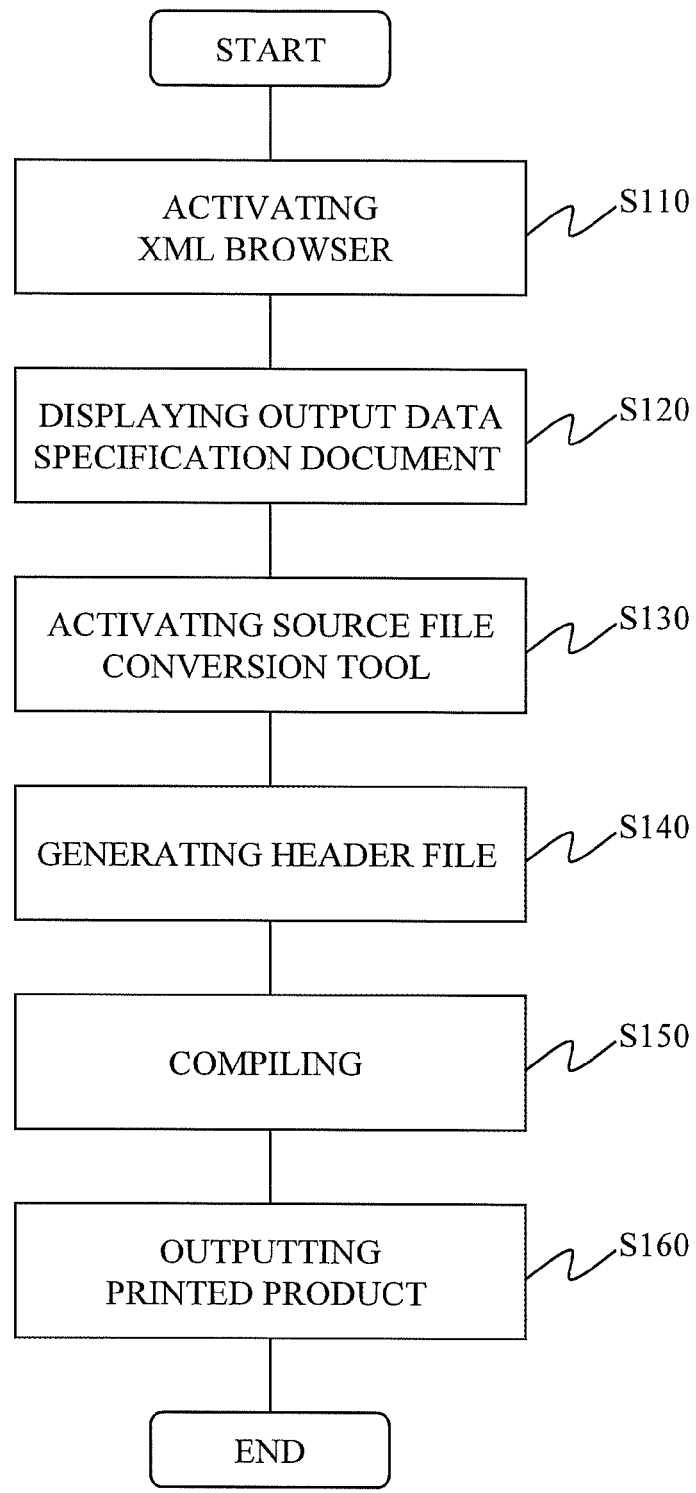
FIG. 11 illustrates a flow of a control of an electronic device system.

FIG. 11 illustrates the flow of a control of an electronic device system. From the following description, an exemplary procedure in which the image forming apparatus and the computer of the electronic device execute the program for the electronic device will be apparent.

Step S110: As the processor of the electronic device operates the program, the XML browser is activated, and the XML file is input into the XML browser.

Step S120: The output data specification document is displayed on the display apparatus by the XML browser (display procedure).

Step S130: As the processor of the electronic device operates the program, the source file conversion tool is activated, and the XML file is input into the source file conversion tool.

Step S140: The header file of the transaction part is automatically generated by the source file conversion tool (transaction file creation procedure). In this step, the function information and the argument necessary for the function are collected into the structure that is described in FIG. 10 to create the header file.

Step S150: As the processor of the electronic device operates the program, the program file, the header file, and other necessary files are collectively compiled to obtain the object file. The display control unit displays the obtained object file on the display apparatus.

Step S160: As the processor of the electronic device operates the program to execute the object file, the printing data based on the object file is generated, and the printing data is transmitted from the communication interface of the electronic device to the communication interface of the image forming apparatus. The control unit of the image forming apparatus outputs the printing data received by using the print engine as the printed product (report page, status page). Then, the person visually compares this printed product with the output data specification document displayed on the display apparatus to check a consistency between those, and it is possible to evaluate the output state onto the actual sheet and the output image on the screen.

It should be noted that steps S130 to S160 may be processed first and steps S110 and S120 may be processed later, and also the processes in steps S110 and S120 may be carried out in parallel with the processes in steps S130 to S160.

In this manner, according to the embodiment, the algorithm is provided for automatically generating the output data specification document and the header file of the transaction part. Therefore the generation of bugs due to coding errors can be prevented, and the output data specification document and the header file of the transaction part can be generated at the same time, so that it is possible to shorten the development period.

According to the embodiment, the XML file is created first, and then the output data specification document and the header file of the transaction part are automatically generated. According to this, it is possible to help prevent the generation of defects in which the output data specification document (output image) is different from the printed product (report page obtained through the implementation of the program).

Also, even in a case where the specification change occurs, only the XML file can be corrected.

According to the embodiment, the header file can be set as the transaction file that is compact and does not need much memory capacity by being collected into the header file composed of the function information and the argument necessary for the function without including the control code.

According to the embodiment, as the fixed part is composed of the library function group and the transaction part is composed of the header file, a simple process suffices in that the base file is simply read and written in the transaction file, and the transaction file can be automatically generated easily.

Furthermore, the two software tools (the XML browser and the source file conversion tool) need to be initially created, but once these tools are completed, the output data specification document and the header file of the transaction part are automatically generated, and the subsequent development period (man-hours) can be shortened.

Furthermore, with regard to the new function accompanied by the specification change, a simple correction suffices in that the library function is added to the fixed part and the point to the added library function is only registered in the header file of the transaction part. To elaborate, once created, the library function group of the fixed part does not need the change, and a risk of degradation due to the source code change (irrespective of the addition of modifications, the quality and/or function is degraded from the previous state) is eliminated. This can lead to the quality improvement in the software.

In addition, as the library functions of the fixed part are put into parts for each function, the analysis of the source code can be facilitated, and the maintenance performance can be improved.

The present disclosure is not restricted by the above-mentioned embodiment and can be implemented along with various modifications and substitutions. The base file can also be an HTML file, an SGML file, or the like, instead of the XML file.

Also, the algorithm of the present disclosure can be utilized in various integrated devices realized by using C language or C++ language.

Furthermore, the configurations of image forming apparatus 101 and electronic device 201 illustrated in the above mentioned embodiments are all exemplifications, and these can be of course appropriately modified and implemented.

It should be understood that various changes and modifications to the presently described embodiments herein will be apparent to those skilled in the art. Such changes and modifications can be made without departing from the spirit and scope of the present subject matter and without diminishing its intended advantages. It is therefore intended that such changes and modifications be covered by the appended claims.

What is claimed is:

1. A non-transitory computer-readable recording medium storing a program for an electronic device that is executed by a computer of the electronic device connected to a display apparatus and an output apparatus, the program for the electronic device comprising:

a first program code for causing the computer to read information necessary for a display on the display apparatus from a base file described in a specific descriptive language;

a second program code for causing the computer to display information according to contents of the base file on the display apparatus based on the information necessary for the display;

a third program code for causing the computer to read, from the base file, machine type dependent information that (i) comprises information necessary to provide a printed product from the output apparatus, (ii) depends on a machine type of the output apparatus, and (iii) can be used in a specific machine type;

a fourth program code for causing the computer to create a transaction file composed of function information and an argument necessary for the function without including a control code based on the machine type dependent information; and a fifth program code for causing the computer to instruct the output apparatus to provide the printed product based on the contents of the base file by using the transaction file and a fixed file composed of machine type independent information that (i) includes the control code, (ii) does not depend on the machine type of the output apparatus, and (iii) can be used in every machine type, wherein the fourth program code causes the computer to (a) create a parent structure and child structures, and (b) collect multiple pieces of the function information and reference destination addresses of the child structures into the parent structure, collect arguments necessary for the respective functions collected into the parent structure into the child structures, and delete any unnecessary arguments from the child structures, wherein the child structures are respectively independent separate structures for each function, wherein the base file includes a block comprising: the information necessary for the display or the printed product, at least one library function, at least one message associated with the display or the printed product, and at least one tag defining whether the information in the block is necessary for the display or the printed product, wherein the first program code causes the computer to read, from the block, information that is defined as necessary for the display by the at least one tag, and wherein the third program code causes the computer to read, as the machine type dependent information, all of the information in the block.

2. The non-transitory computer-readable recording medium according to claim 1, wherein the fourth program code causes the computer to create the transaction file by collecting the function information and the argument necessary for the function into a structure.

3. The non-transitory computer-readable recording medium according to claim 1, wherein the specific descriptive language is extensible markup language (XML).

4. The non-transitory computer-readable recording medium according to claim 1, wherein the specific descriptive language is hyper text markup language (HTML).

5. The non-transitory computer-readable recording medium according to claim 1, wherein the transaction file is a C header file.

6. The non-transitory computer-readable recording medium according to claim 1, further comprising a sixth program code for causing the computer to generate an object file based on the transaction file and the fixed file.

7. The non-transitory computer-readable recording medium according to claim 1, wherein the fixed file comprises the function information, and wherein the fifth program code causes the computer to avoid compiling any unnecessary functions by excluding the unnecessary functions in the machine type from link targets of the functions in the fixed file at a time when the transaction file and the fixed file are compiled.

8. The non-transitory computer-readable recording medium according to claim 7, wherein the fourth program code causes the computer to comment out the unnecessary functions in the transaction file, and wherein the fifth program code causes the computer to call, of the functions that are prepared in the fixed file, the functions that are not commented out in the transaction file and avoid calling the unnecessary functions commented out in the transaction file.

9. The non-transitory computer-readable recording medium according to claim 1, wherein the base file comprises at least one function name and at least one message, wherein, in response to the at least one function name not corresponding to a function for printing, the first program code causes the computer to read the at least one message as the information necessary for the display from the base file.

10. The non-transitory computer-readable recording medium according to claim 9, wherein, in response to the at least one function name corresponding to the function for printing, the third program code causes the computer to read the items, as the information necessary for the printed product.

11. An electronic device system comprising:

a display apparatus configured to read information necessary for a display from a base file described in a specific descriptive language and display information according to contents of the base file based on the information necessary for the display;

an output apparatus configured to provide a printed product based on the contents of the base file by compiling a transaction file and a fixed file composed of machine type independent information that (i) includes a control code, (ii) does not depend on a machine type of the output apparatus, and (iii) can be used in every machine type; and a transaction file creation unit configured to read, from the base file, machine type dependent information that (i) comprises information necessary to provide the printed product, (ii) depends on the machine type of the output apparatus, and (iii) can be used in a specific machine type, and create the transaction file composed of the function information and an argument necessary for the function without including the control code based on the machine type dependent information, wherein the transaction file creation unit is configured to (a) create a parent structure and child structures, (b) collect multiple pieces of the function information and reference destination addresses of the child structures into the parent structure, collect the arguments necessary for the respective functions collected in the parent structure into the child structures, and delete any unnecessary arguments in the child structures, and wherein the child structures are respectively independent separate structures for each function, wherein the base file includes a block comprising: the information necessary for the display or the printed product, at least one library function, at least one message associated with the display or the printed product, and at least one tag defining whether the information in the block is necessary for the display or the printed product, wherein the display apparatus reads, from the block, information that is defined as necessary for the display by the at least one tag, and wherein the output apparatus reads, as the machine type dependent information, all of the information in the block.

12. The electronic device system according to claim 11, wherein the transaction file creation unit is configured to create the transaction file by collecting the function information and the argument necessary for the function into a structure.

13. The electronic device system according to claim 11, wherein the specific descriptive language is extensible markup language (XML).

14. The electronic device system according to claim 11, wherein the specific descriptive language is hyper text markup language (HTML).

15. The electronic device system according to claim 11, wherein the transaction file is a C header file.

16. The electronic device system according to claim 11, wherein the output apparatus is further configured to generate an object file based on the transaction file and the fixed file.

17. A control method for an electronic device system, the method comprising:
a display apparatus reading information necessary for a display from a base file described in a specific descriptive language and displaying information according to contents of the base file based on the information necessary for the display;
a transaction file creation unit reading, from the base file, machine type dependent information that (i) comprises information necessary to provide a printed product, (ii) depends on a machine type of an output apparatus, and (iii) can be used in a specific machine type, and creating a transaction file composed of function information and an argument necessary for the function without including a control code based on the machine type dependent information;
the output apparatus providing the printed product based on the contents of the base file by using the transaction file and a fixed file composed of machine type independent information that (i) includes the control code, (ii) does not depend on the machine type of the output apparatus, and (iii) can be used in every machine type, and
the transaction file creation unit
(a) creating a parent structure and child structures, and
(b) collecting multiple pieces of the function information, reference destination addresses of the child structures into the parent structure and collecting the arguments necessary for the respective functions collected in the parent structure into the child structures, and deleting any unnecessary arguments in the child structures,
wherein the child structures are respectively independent separate structures for each function,
wherein the base file includes a block comprising: the information necessary for the display or the printed product, at least one library function, at least one message associated with the display or the printed product, and at least one tag defining whether the information in the block is necessary for the display or the printed product,
wherein the display apparatus reads, from the block, information that is defined as necessary for the display by the at least one tag, and
wherein the output apparatus reads, as the machine type dependent information, all of the information in the block.

18. The control method for the electronic device system according to claim 17, further comprising:
the transaction file creation unit creating the transaction file by collecting the function information and the argument necessary for the function into a structure.

19. The control method for the electronic device system according to claim 17, wherein the specific descriptive language is extensible markup language (XML).

20. The control method for the electronic device system according to claim 17, wherein the specific descriptive language is hyper text markup language (HTML).

21. The control method for the electronic device system according to claim 17, wherein the transaction file is a C header file.

22. A non-transitory computer-readable recording medium storing a program for an electronic device that is executed by a computer of the electronic device connected to a display apparatus and an output apparatus, the program for the electronic device comprising:
a first program code for causing the computer to read information necessary for a display on the display apparatus from a base file described in a specific descriptive language;
a second program code for causing the computer to display information according to contents of the base file on the display apparatus based on the information necessary for the display;
a third program code for causing the computer to read, from the base file, machine type dependent information that (i) comprises information necessary to provide a printed product from the output apparatus, (ii) depends on a machine type of the output apparatus, and (iii) can be used in a specific machine type;
a fourth program code for causing the computer to create a transaction file comprising at least one function and an argument necessary for the function without including a control code based on the machine type dependent information; and
a fifth program code for causing the computer to instruct the output apparatus to provide the printed product based on the contents of the base file by compiling the transaction file and a fixed file composed of machine type independent information that (i) includes the control code, (ii) does not depend on the machine type of the output apparatus, and (iii) can be used in every machine type,
wherein the fixed file comprises functions,
wherein the fifth program code causes the computer to avoid compiling any unnecessary functions by excluding the unnecessary functions in the machine type from link targets of the functions in the fixed file at a time when the transaction file and the fixed file are compiled,
wherein the base file includes a block comprising: the information necessary for the display or the printed product, at least one library function, at least one message associated with the display or the printed product, and at least one tag defining whether the information in the block is necessary for the display or the printed product,
wherein the first program code causes the computer to read, from the block, information that is defined as necessary for the display by the at least one tag, and
wherein the third program code causes the computer to read, as the machine type dependent information, all of the information in the block.

23. The non-transitory computer-readable recording medium according to claim 22,
wherein the fourth program code causes the computer to comment out the unnecessary function in the transaction file, and wherein the fifth program code causes the computer to call, of the functions that are prepared in the fixed file, the functions that are not commented out in the transaction file and avoid calling the unnecessary functions commented out in the transaction file.

24. A non-transitory computer-readable recording medium storing a program for an electronic device that is executed by a computer of the electronic device connected to a display apparatus and an output apparatus, the program for the electronic device comprising:
- a first program code for causing the computer to read information necessary for a display on the display apparatus from a base file described in a specific descriptive language;
- a second program code for causing the computer to display information according to contents of the base file on the display apparatus based on the information necessary for the display;
- a third program code for causing the computer to read, from the base file, machine type dependent information that (i) comprises information necessary to provide a printed product from the output apparatus, (ii) depends on a machine type of the output apparatus, and (iii) can be used in a specific machine type;
- a fourth program code for causing the computer to create a transaction file composed of function information and an argument necessary for the function without including a control code based on the machine type dependent information; and
- a fifth program code for causing the computer to instruct the output apparatus to provide the printed product based on the contents of the base file by using the transaction file and a fixed file composed of machine type independent information that (i) includes the control code, (ii) does not depend on the machine type of the output apparatus, and (iii) can be used in every machine type, wherein the base file includes items comprising a function name and a message, wherein the first program code causes the computer to read an item, as the information necessary for a display, of the message from the base file and avoid reading an item of the function name corresponding to a function for printing from the base file, wherein the base file includes a block comprising: the information necessary for the display or the printed product, at least one library function, at least one message associated with the display or the printed product, and at least one tag defining whether the information in the block is necessary for the display or the printed product, wherein the first program code causes the computer to read, from the block, information that is defined as necessary for the display by the at least one tag, and wherein the third program code causes the computer to read, as the machine type dependent information, all of the information in the block.

25. The non-transitory computer-readable recording medium according to claim 24,
wherein the third program code causes the computer to read the items, as the information necessary to provide the printed product, of the message and the function name corresponding to the function for printing from the base file.

* * * * *